(12) United States Patent
Sonnleithner et al.

(10) Patent No.: US 7,853,470 B2
(45) Date of Patent: Dec. 14, 2010

(54) ASSIGNING TANGIBLE ASSETS TO WORKPLACES

(75) Inventors: Mirjam Sonnleithner, San Francisco, CA (US); Bettina Giese, Heidelberg (DE)

(73) Assignee: SAP AG, Walldorf (DE)

( * ) Notice: Subject to any disclaimer, the term of this patent is extended or adjusted under 35 U.S.C. 154(b) by 904 days.

(21) Appl. No.: 11/328,672

(22) Filed: Jan. 10, 2006

(65) Prior Publication Data

US 2006/0155630 A1   Jul. 13, 2006

(51) Int. Cl.
G06F 9/46 (2006.01)
(52) U.S. Cl. .......................................... 705/8
(58) Field of Classification Search ................ 705/8
See application file for complete search history.

(56) References Cited

U.S. PATENT DOCUMENTS

| | | | | |
|---|---|---|---|---|
| 6,023,702 | A  * | 2/2000 | Leisten et al. | 707/100 |
| 6,044,356 | A  * | 3/2000 | Murthy et al. | 705/8 |
| 6,272,472 | B1 * | 8/2001 | Danneels et al. | 705/27 |
| 6,738,748 | B2 * | 5/2004 | Wetzer | 705/9 |
| 6,931,621 | B2 * | 8/2005 | Green et al. | 717/100 |
| 7,181,512 | B1 * | 2/2007 | Lesher et al. | 709/223 |
| 7,222,369 | B2 * | 5/2007 | Vering et al. | 726/28 |
| 7,289,619 | B2 * | 10/2007 | Vivadelli et al. | 379/212.01 |
| 2003/0187967 | A1 * | 10/2003 | Walsh et al. | 709/223 |
| 2004/0193938 | A1 * | 9/2004 | Shah et al. | 714/2 |

OTHER PUBLICATIONS

Talukder, Shabbir; Knapp, Gerald M. "Equipment Assignment to Multiple Overhaul Blocks in Series Systems". 2002. Journal of Quality in Maintenance Engineering. vol. 8, No. 4. pp. 319-330.*
Spoerl, David R.; Wood, R. Kevin. "A Stochastic Generalized Assignment Problem". Jan. 14, 2004. pp. 1-32.*

* cited by examiner

Primary Examiner—Peter Choi
(74) Attorney, Agent, or Firm—Buckley, Maschoff & Talwalkar LLC (57) ABSTRACT

A method for assigning tangible assets to workplaces includes receiving input data provided at an input interface, the input data including information about a situation that requires to update a structure of current assignments of specific tangible assets to specific workplaces, selecting, dependent upon the information of the received input data, a workplace profile from a profile database, wherein the workplace profile corresponds to a workplace type and includes a predefined set of asset types, of which types specific tangible assets can be to be assigned to a specific workplace of the workplace type, retrieving, from an assignment database, assignment data including information about the current assignment structure, comparing the selected workplace profile with the retrieved assignment data, determining an update proposal for updating the current assignment structure, and providing output data to an output interface, the output data including information about the update proposal.

17 Claims, 5 Drawing Sheets

ASSIGNING TANGIBLE ASSETS TO WORKPLACES

CROSS REFERENCE TO RELATED APPLICATIONS

This application claims priority to European Application entitled "Method and computer system for assigning tangible assets to workplaces," filed on Jan. 10, 2005, Application No. EP 05075057.9, the entire contents of which are incorporated herein.

BACKGROUND

The present invention relates to data processing by digital computer, and more particularly to assigning tangible assets to workplaces.

Tangible assets are often assigned to users, such as employees of an organization. Typically, information about the availability, in place and time, of assets that are (to be) assigned to users is gathered manually from different sources, such as spreadsheets.

A disadvantage of this process is that it leads to inefficient use of resources, since often the information is not up-to-date, insufficient or otherwise unreliable. This can lead to a mismatch between the demand for assets and the availability of assets. Accordingly, part of an inventory is unnecessarily left unused or assets required to equip a workplace are not available in the inventory. The latter results in a user having to wait some time before the lacking assets are provided, and therefore not being able to perform his function, and thus results in a reduced use of the assets that are present at the workplace. Also, due to the unreliable information, assets will be transported from one location to another, while at the receiving location the concerning assets are already present. Thus, the process requires a relatively large amount of transport, and accordingly, energy, and leads to an inefficient use of resources.

SUMMARY

The present invention provides methods and apparatus, including computer program products, for assigning tangible assets to workplaces.

In general, in one aspect, the invention features a computer-implemented method for assigning tangible assets to workplaces including receiving input data provided at an input interface of a computer system, the input data including information about a situation that requires to update a structure of current assignments of specific tangible assets to specific workplaces, selecting, dependent upon the information of the received input data, a workplace profile from a profile database, wherein the workplace profile corresponds to a workplace type and includes a predefined set of asset types, of which types specific tangible assets are to be assigned to a specific workplace of the workplace type, retrieving, from an assignment database, assignment data including information about the current assignment structure, comparing the selected workplace profile with the retrieved assignment data, determining an update proposal for updating the current assignment structure, and providing output data to an output interface of the computer system, the output data including information about the update proposal.

In embodiments, the update proposal can include a proposal for performing an action with at least one of the specific tangible assets, and the output data can include information about the action.

The method can include receiving by the computer system, in response to the output data, response input data including an acceptance or rejection of at least part of the update proposal.

The method can include actually updating the current assignment structure by the computer system.

Actually updating the current assignment structure can include adding, by the computer system, to the current assignment structure, a reservation for assigning a specific tangible asset to a specific workplace.

The method can include actually performing the action with at least one of the specific tangible assets.

The update proposal can include at least two sub-proposals, of which a first one can be directed to a different user of the computer system than a second one.

Determining the update proposal can be based upon computer-implemented methods for minimizing costs and/or investments of performing actions related to tangible assets in accordance with the updating of the current assignment structure, while the updating satisfies the requirement by the situation.

The input data can include data representing a role of a person in an organization and selecting can include selecting a workplace profile linked to the role.

The input data can include data representing a start of the role of the person, and wherein the situation requires specific tangible assets to be assigned to the person at the time of the start of the role.

The input data can include data representing a termination of the role of the person, and wherein the situation requires specific tangible assets to be reassigned from the person at the time of the termination of the role.

The input data can include data representing a group of persons and selecting can include selecting a workplace profile linked to the group of persons.

The input data can include data representing an activity and selecting can include selecting a workplace profile linked to the activity.

The input data can include data representing a location and selecting can include selecting a workplace profile linked to the location.

Other features and advantages of the invention are apparent from the following description, and from the claims.

BRIEF DESCRIPTION OF THE DRAWINGS

Like reference numbers and designations in the various drawings indicate like

DETAILED DESCRIPTION

Figure 1:
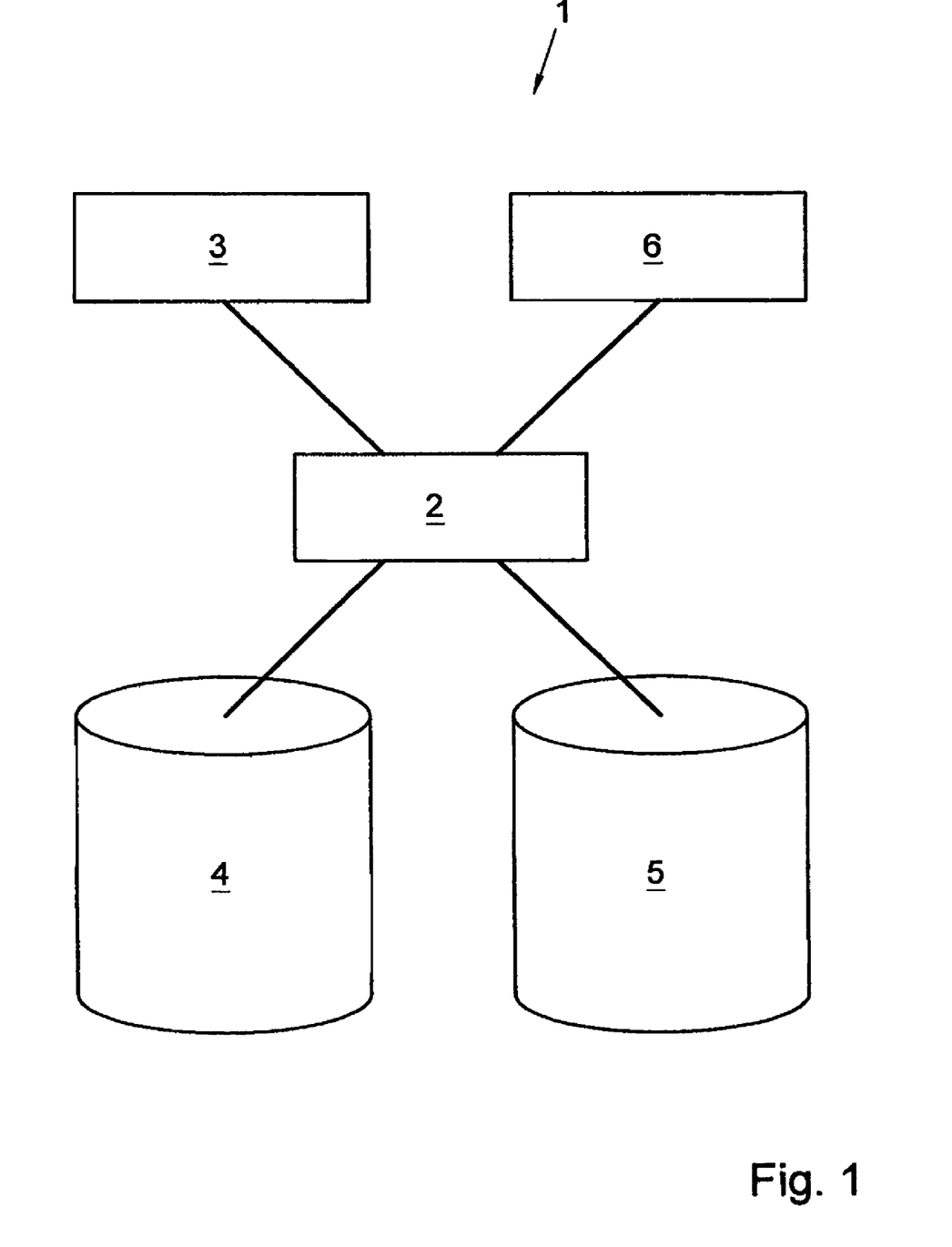
FIG. 1 is a block diagram of an exemplary computer system.

FIG. 1 shows an exemplary computer system 1 for assigning tangible assets to workplaces. The tangible assets can be diverse, such as a workroom, furniture, mobile devices, telecommunications equipment, hardware, software, or other utensils desired at a workplace. Also, the workplace can be of diverse nature. Within the scope of the present invention, the word "workplace" broadly refers to a work-assisting environment of a (group of) person(s), of a location, of an activity or of another purpose, for example, an office.

The system 1 includes an input interface 3. At the input interface 3, input data can be received including information about a situation that requires updating a structure of current assignments of specific tangible assets to specific workplaces. The input data can for example reflect a new hire of an employee, a dismissal of an employee or the purchase, reselling or scrapping of assets.

Figure 2:
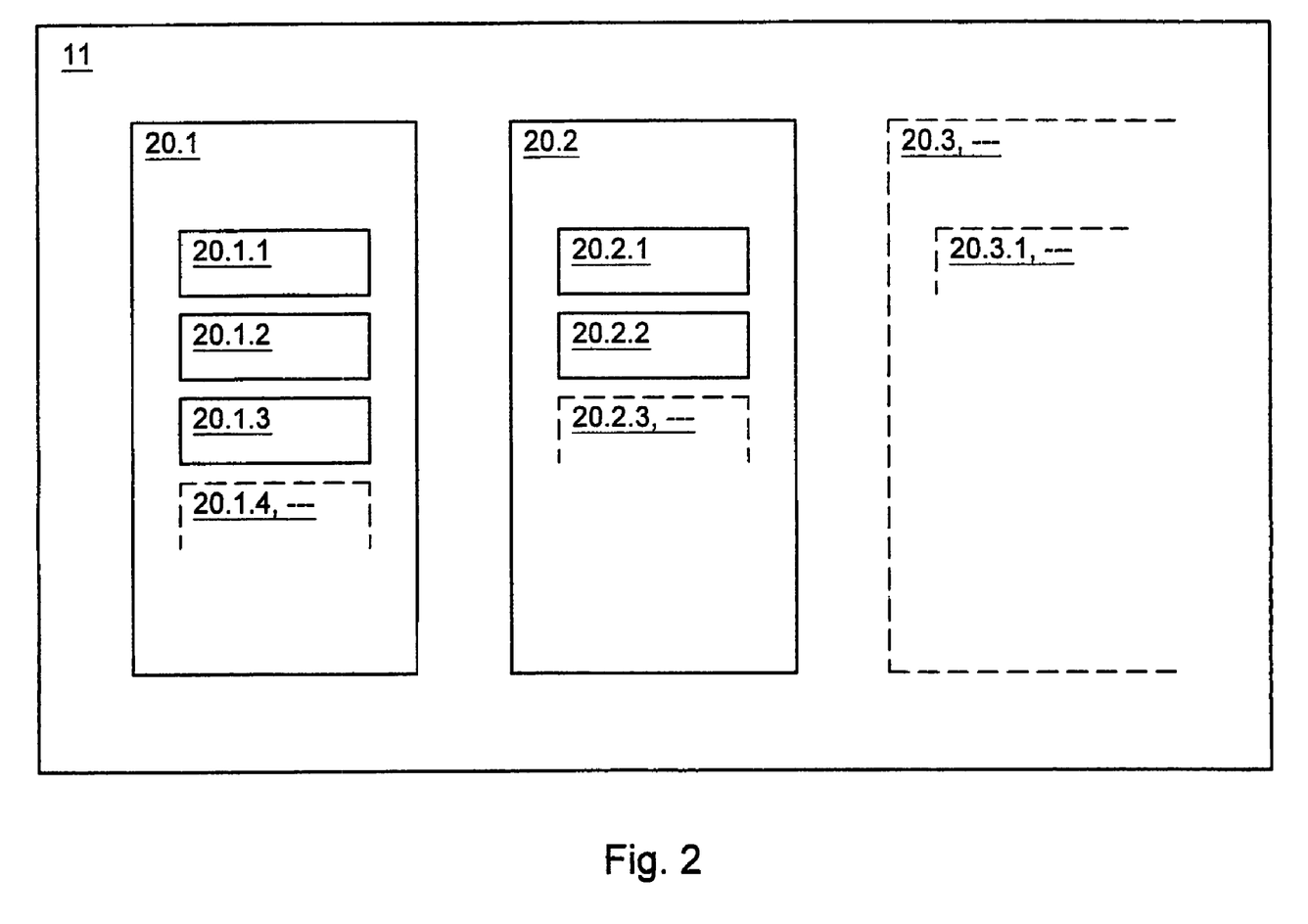
FIG. 2 is an exemplary list of specific tangible assets of different types.

In this example, the assignment structure includes an asset list 11 (FIG. 2) of specific tangible assets 20.$i.j$, which in FIG. 2 are classified according to their corresponding asset types 20.$i$. For example, different specific computer monitors, each having its own serial number may be classified under the asset type "computer monitor". The asset list 11, together with detailed information per specific asset 20.$i.j$ of the list, is stored in a database, described below. The detailed information per asset 20.$i.j$ may include specification details such as serial numbers, actual financial value, location, ownership data, maintenance contract data, and so forth.

The assignment structure also includes a workplace list 12 (see FIG. 3) of specific workplaces 30.$k.l$, which are classified according to their corresponding workplace types 30.$k$. For example, different specific workplaces, each for a specific secretary, may be classified under the workplace type "secretary workplace." The workplace list 12, together with detailed information per specific workplace 30.$k.l$, is stored in a database, as is described below.

Figure 3:
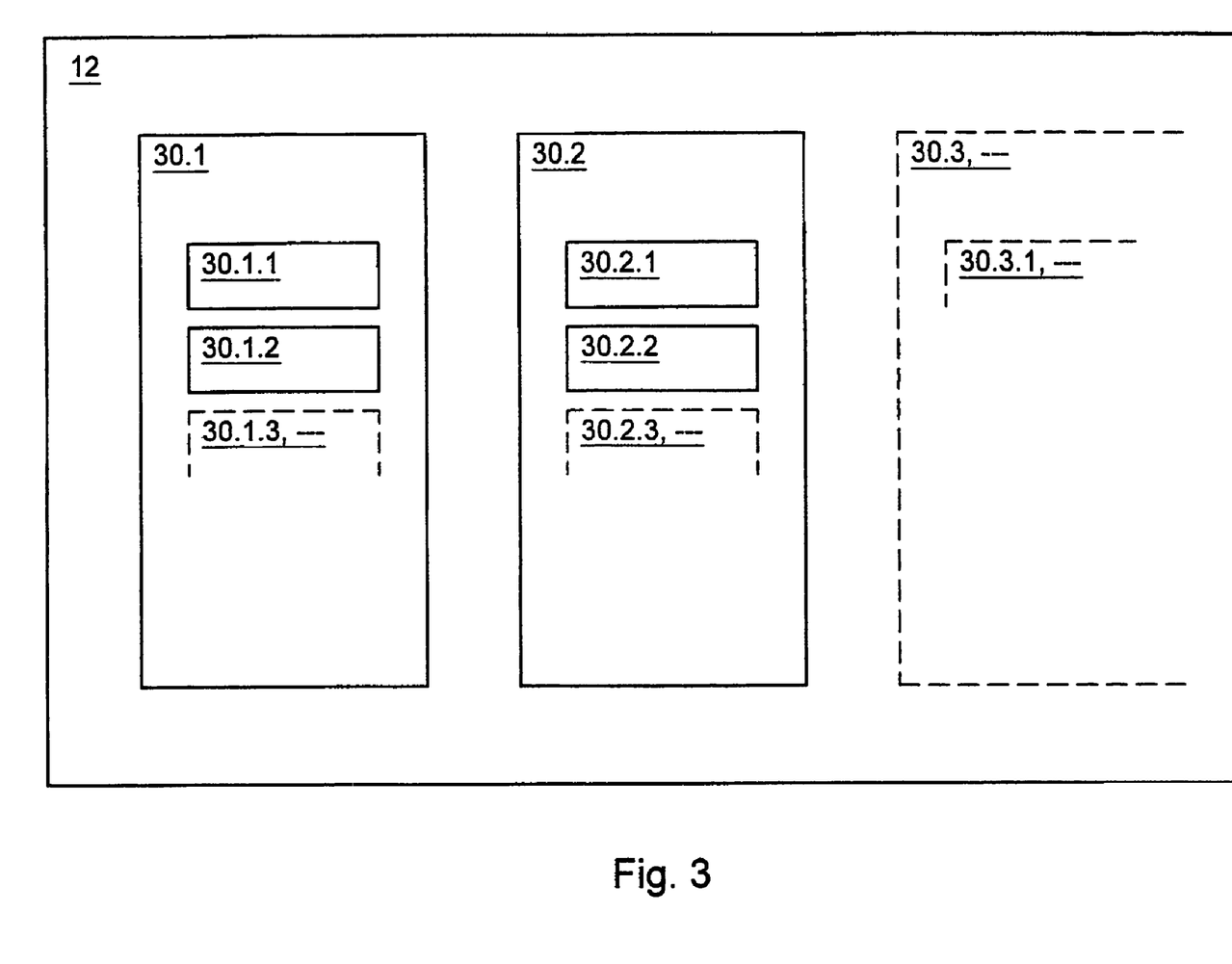
FIG. 3 is an exemplary list of specific workplaces of different types.

The assignment structure furthermore includes assignment information stored in a database. The assignment information includes actual assignments of specific assets 20.$i.j$ of the asset list 11 to specific workplaces of the workplace list 12, as well as specific time periods of such assignments. For example, such an actual assignment may be the assignment of a specific piece of furniture or equipment to the specific workplace of the secretary called Maria Johnsson. However, the assignment information may also include reservations for such assignments, as described below.

The system 1 further includes an assignment database 5 for storing assignment data including information about the current assignment structure. Therefore, in the assignment database 5 then may be stored the actual assignments of specific assets 20.$i.j$ to specific workplaces 30.$k.l$ and/or the specific time periods of such assignments and/or the reservations for such assignments. Also, the asset list 11 and the workplace list 12 may be stored in the assignment database 5. Thus, information about the availability and assignment of assets in place and time can be derived from the assignment database 5.

Figure 4:
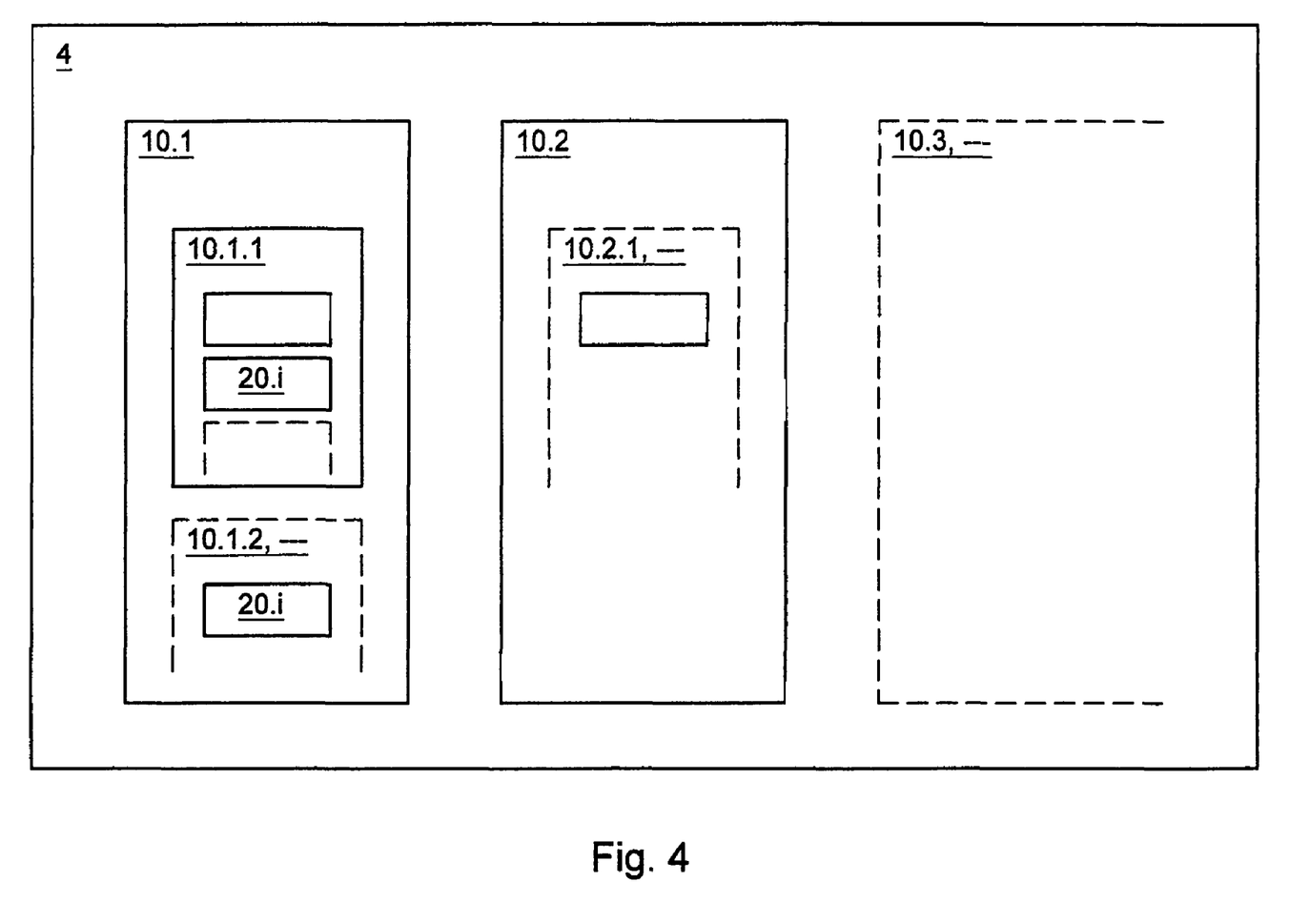
FIG. 4 is an exemplary profile database.

The system 1 further includes a profile database 4 for storing workplace profiles (FIG. 1 and FIG. 4). In FIG. 4, the workplace profiles 10.$m.n$ are classified according to corresponding classes 10.$m$ of such workplace profiles. Each workplace profile corresponds to a workplace 30.$k$ (FIG. 3) and includes (FIG. 4) a predefined set of asset types 20.$i$, of which types 20.$i$ specific tangible assets 20.$i.j$ (FIG. 2) are to be assigned to a specific workplace 30.$k.l$ of the workplace type 30.$k$. For example, for a workplace type "workplace for a research and development (R&D) employee" a corresponding workplace profile can include asset reflecting utensils or objects useful for performing R&D, such as "room at the R&D-department," "scientific computer workstation," "R&D-software package," and so forth. And, for example, for a workplace type "workplace for a salesman," a corresponding workplace profile can include for example such asset types as "room at the sales department," "laptop computer," "Sales software package," "mobile telephone," "Sales-class automobile," and so forth.

Figure 5:
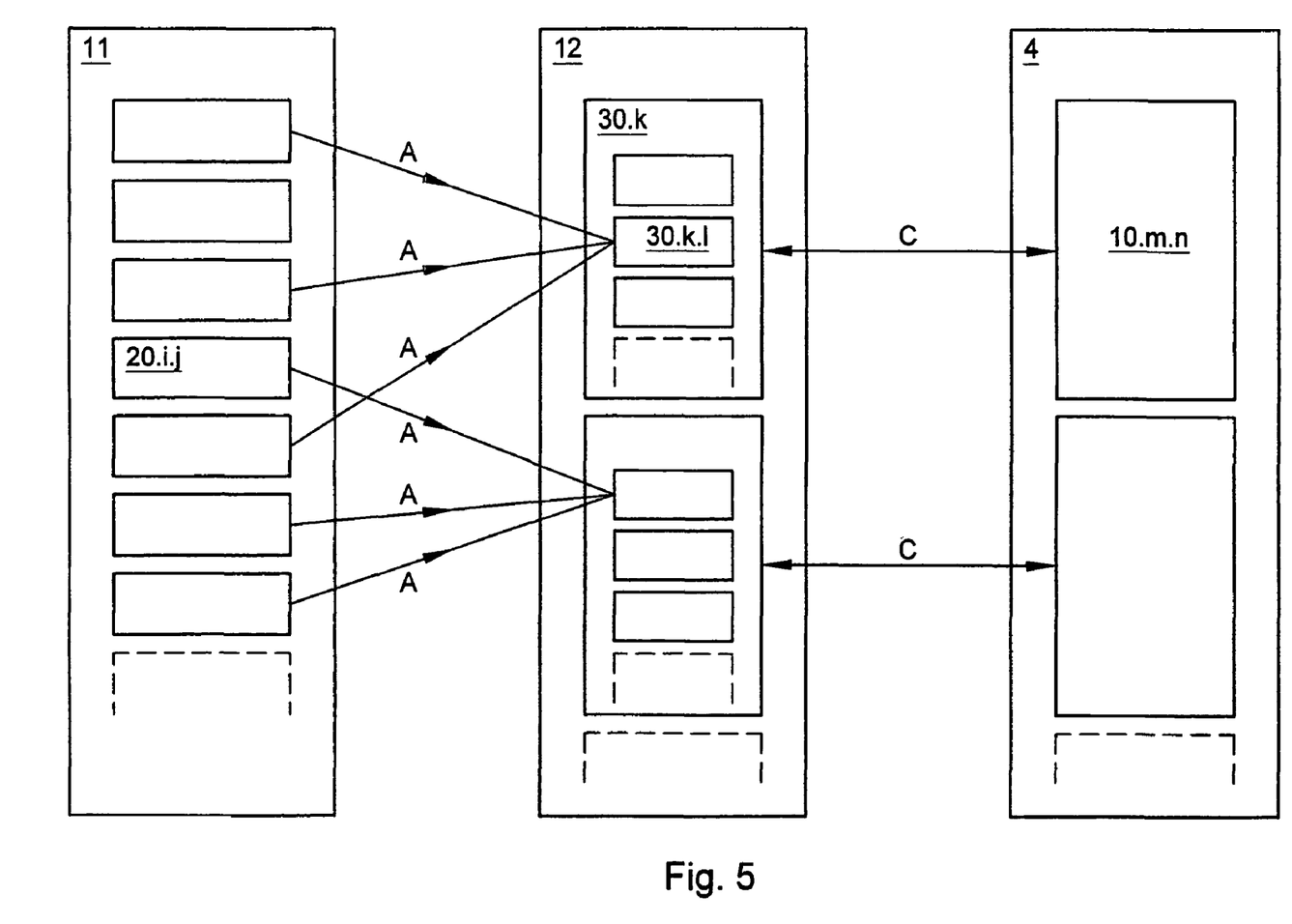
FIG. 5 illustrates exemplary lists of assets, workplaces and workplace profiles.

FIG. 5 schematically shows an example of assignments (denoted by single arrows A) of specific assets 20.$i.j$ of the asset list 11 to specific workplaces 30.$k.l$ of the workplace list 12. FIG. 5 also shows that workplace profiles stored in the profile database 4 correspond (denoted by double arrows C) to the workplace types 30.$k$. That is, to the specific workplaces of a certain type 30.$k$ there are to be assigned specific assets 20.$i.j$ of the asset types 20.$i$ that are predefined in the workplace profile 10.$m.n$ that correspond to the workplace type 30.$k$.

In some examples, the profile database 4 and the assignment database 5 may be integrated with each other to form a single database.

The system 1 further includes an output interface 6 for providing output data by the system.

The system 1 further includes a processor 2 communicatively connected to the input interface 3, the output interface 6, the profile database 4 and the assignment database 5. The processor 2 is arranged for selecting a workplace profile from the profile database 4 dependent upon the information of the received input data and for retrieving assignment data from the assignment database 5. Furthermore, the processor 2 is arranged for comparing the selected workplace profile 10.$m.n$ with the retrieved assignment data, for determining a proposal for updating the current assignment structure, and for providing output data to the output interface 6, the output data including information about the update proposal.

To illustrate an example, a new hire of an employee by an organization is considered below. Such "new hire"-situation in general requires to update the current assignment structure that is in use for that organization.

Via the input interface 3, a personnel officer of the organization provides to the system 1 input data concerning the new hire. This input data may include many different aspects, such as name (assume for example: John Lewis) and other identification data of the new employee, his or her position to be fulfilled (assume for example: R&D-engineer), the commencement date of employment, duration of employment, and so forth. After receiving the input data, the system 1 selects a workplace profile from the profile database 4, substantially based upon the new employee's position to be fulfilled (in the example: R&D-engineer). That is, the position defines the type of workplace 30.$k$ (in the example: a workplace for an R&D-engineer), while the workplace profile 10.$m.n$ corresponds to the type of workplace 30.$k$. The system 1 creates in the workplace list 12 a new item representing the new specific workplace for the specific new employee (in the example: the specific workplace for R&D-engineer John Lewis). The workplace profile 10.$m.n$ includes a list of asset types 20.$i$, of which specific assets 20.$i.j$ are to be assigned to the new employee's specific workplace as per the commencement date of his or her employment.

In this example a workplace refers to a work-assisting environment of an employee. Accordingly, in this example the workplace profile 10.m.n belongs to a class 10.$m$ of workplace profiles related to a single person.

After the system 1 has retrieved from the assignment database 5 assignment data including information about the current assignment structure, it can derive therefrom the availability and assignment of assets 20.$i.j$, for example in place and time. By comparing the retrieved assignment data, in particular the availability and assignment of assets 20.$i.j$. derived therefrom, with the selected workplace profile 10.$m.n$, the system determines which of the assets 20.$i.j$ required by the new employee will be available within the organization and/or of which asset type 20.*i* required assets 20.*i.j* have to be ordered, for example by a purchase department of the organization.

Thus, the system is able to determine a proposal for updating the current assignment structure. The proposal may include for example actions to be performed in relation to a number of assets. These actions may for example be the transfer of a computer to a room, the installation of software on that computer, the purchase of furniture for that room, and so forth. The determining of the update proposal is based upon computer methods. These methods can then determine those actions that, on the one hand, adequately supply the new employee with requested assets 20.*i.j*, and, on the other hand, involve minimum costs and/or investments. For instance, the system can be arranged to take into account costs related to involved transport of assets and/or costs related to involved production loss due to the yet unavailability of assets at workplaces.

The system 1 may provide output data including information about the determined update proposal to the output interface 6. For the determined update proposal, the system may for example create worklist items for different departments of the organization, for example an information technology department, a facility management department, a purchase department, an accounting department, and so forth. A worklist item for an information technology department may for example include to provide an IT-infrastructure. A worklist item for a facility management department may for example include to provide a room. Different worklist items may be geared to one another, for instance in that the installation of an Object is to be performed after the object has been purchased.

Also, a system proposal may include different options for the addressee to choose from. For instance, the system may generate two or more proposals. For example, one proposal which minimizes costs and another proposal which minimizes another aspect, for instance the amount of energy involved. In response to the proposals, a user or operator of the system may select one proposal.

In addition to generating a proposal in relation to an asset, the system may already pre-update the current assignment structure, for example by adding to the assignment information of the current assignment structure a reservation for an assignment of a specific asset 20.*i.j* to the employee's specific workplace for a specific time period, and by storing this reservation in the assignment database 5.

A system user being confronted with a system generated worklist item containing an assignment update proposal, can provide response input data to the system as to whether the person accepts or rejects the system proposal, or, if applicable, which of the system proposed options are accepted. Based upon such response input data, the system can update the current assignment structure accordingly. The system can for example convert a reservation for an assignment into an actual assignment, or cancel a reservation. The response input data can be provided to the system via suitable control means of the input interface 3.

A system generated worklist item may also contain a question as to whether or not a proposed action has actually been followed up by performing an action with a specific asset 20.*i.j*. In such case the response input data can contain an answer to the question and, optionally, additional information, for example about an actually performed action. In response to the receiving of the additional information by the system, the system may store further relevant information in the assignment database 5.

To illustrate another example, a termination of a position of an employee of an organization is considered next.

Via the input interface 3, a personnel officer of the organization provides to the system 1 input data concerning the termination. This input data may include identification data of the employee whose position is to be terminated, as well as the effective date of termination. The input data may also include information as to whether the employee is leaving the organization or whether the employee changes position within the organization. After receiving the input data, the system 1 retrieves from the assignment database 5 assignment data of those assets 20.*i.j* assigned to the concerning employee's workplace 30.*k.l*. In case the employee is leaving the organization, the system may generate proposals for reassigning the assets 20.*i.j* to be released from the concerning employee. Those assets can for example be assigned to an inventory including goods either for reuse, for scrap or for resell. In case the employee is changing position within the organization, the system may additionally select from the profile database 4 a new workplace profile 10.*m.n*. belonging to the employee's new position. By comparing the assignment data of those assets which are assigned to the concerning employee with the new workplace profile, the system may generate suitable update proposals. Such proposals may involve that some of the assets 20.*i.j* already assigned to the employee will remain assigned to the employee.

The examples described above apply similarly to cases wherein it is more generally referred to a role of a person instead of to a position of an employee.

As mentioned above, the method can be applied to workplaces 30.*k.l* of diverse nature. A workplace 30.*k.l* may also refer to a Work-assisting environment of a group of persons, of a location, of an Activity or of another purpose. That is, a group of persons may need assignment of assets to be shared among the different members of the group. Also, assets may need to be assigned to a location, for example to an office branch or, within an office branch, to a special purpose room, such as a conference room, computer room, and so forth. Furthermore, assets may need to be assigned to art activity, for example to an exhibition or a festive activity to be held, and so forth.

In such cases, different classes 10.*m* (FIG. 3) of workplace profiles to be stored in the profile database 4 can be defined. For example, a class of group-related workplace profiles, a class of activity-related workplace profiles, a class of location-related workplace profiles, or classes of other purpose-related workplace profiles. The assigning of assets based upon such different classes 10.*m* of workplace profiles can be performed in a similar way as the assigning of assets based upon single-person-related workplace profiles according to the examples given above.

As another example, a workplace 30.*k.l* may also refer to a work-assisting environment of a tangible asset. For example, such a tangible asset may be a personal computer to which different tangible assets, such as different personal computer accessories, are to be assigned. Note that, as described above, such a personal computer may itself be assigned to a workplace, for example to a workplace of a person. Therefore, the described method and system for assigning tangible assets to workplaces are applicable for assignment structures of multi-level hierarchies.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computer-implemented method for assigning tangible assets to workplaces, the method comprising:
   receiving input data provided at an input interface of a computer system, the input data comprising information about a situation that requires updating a structure of current assignments of specific tangible assets to specific workplaces;
   selecting, dependent upon the information of the received input data, a workplace profile from a profile database associated with the computer system, wherein the workplace profile corresponds to a workplace type and includes a predefined set of asset types, of which types specific tangible assets are to be assigned to a specific workplace of the workplace type, wherein at least one of the specific tangible assets has a different specific tangible asset assigned to it;
   retrieving, from an assignment database associated with the computer system, assignment data comprising information about the current assignment structure;
   comparing, via a processor associated with the computer system, the selected workplace profile with the retrieved assignment data;
   determining, via a processor associated with the computer system, an update proposal for updating the current assignment structure, the update proposal including a plurality of update proposals generated by the computer system, wherein at least one of the update proposals is for performing at least one action with at least one of the specific tangible assets, wherein determining the update proposal is based upon computer-implemented methods for minimizing costs of performing actions related to specific tangible assets in accordance with the updating of the current assignment structure, while the updating satisfies the requirement by the situation, wherein the computer-implemented methods for minimizing costs and/or investments of performing actions related to specific tangible assets account for costs related to transport of the specific tangible assets and at least one specific tangible asset is assigned to an inventory including goods for at least one of reuse, scrap, or resale;
   providing, via a processor associated with the computer system, output data to an output interface of the computer system, the output data comprising information options about the plurality of update proposals from which a user may select and including information about the at least one action; and
   performing the at least one action with at least one of the specific tangible assets wherein the specific tangible asset is software and the at least one action includes installing the software on a workplace computer.

2. The computer-implemented method of claim 1 further comprising receiving by the computer system, in response to the output data, response input data comprising an acceptance or rejection of at least part of the update proposal.

3. The computer-implemented of claim 2 further comprising actually updating the current assignment structure by the computer system.

4. The computer-implemented method of claim 3 wherein actually updating the current assignment structure comprises adding, by the computer system, to the current assignment structure a reservation for assigning a specific tangible asset to a specific workplace.

5. The computer-implemented method of claim 4 wherein the update proposal comprises at least two sub-proposals, of which a first one is directed to a different user of the computer system than a second one.

6. The computer-implemented method of claim 5 wherein the input data comprise data representing a role of a person in an organization and wherein selecting comprises selecting a workplace profile linked to the role.

7. The computer-implemented method of claim 6 wherein the input data comprise data representing a start of the role of the person, and wherein the situation requires specific tangible assets to be assigned to the person at the time of the start of the role.

8. The computer-implemented method of claim 6 wherein the input data comprise data representing a termination of the role of the person, and wherein the situation requires specific tangible assets to be reassigned from the person at the time of the termination of the role.

9. The computer-implemented method of claim 6 wherein the input data comprise data representing a group of persons and wherein selecting comprises selecting a workplace profile linked to the group of persons.

10. The computer-implemented method of claim 6 wherein the input data comprise data representing an activity and wherein selecting comprises selecting a workplace profile linked to the activity.

11. The computer-implemented method of claim 6 wherein the input data comprise data representing a location and wherein selecting comprises selecting a workplace profile linked to the location.

12. A computer system for assigning tangible assets to workplaces, the system comprising:
- an input interface for receiving input data comprising information about a situation that requires to update a structure of current assignments of specific tangible assets to specific workplaces;
- an output interface for providing output data;
- a profile database for storing at least one workplace profile that corresponds to a workplace type and includes a predefined set of asset types, of which types specific tangible assets are to be assigned to a specific workplace of the workplace type, wherein at least one of the specific tangible assets has a different specific tangible asset assigned to it;
- an assignment database for storing assignment data comprising information about the current assignment structure; and
- at least one processor communicatively connected to the input interface, the output interface, the profile database and the assignment database, for selecting a workplace profile from the profile database dependent upon the information of the received input data, retrieving assignment data from the assignment database, comparing the selected workplace profile with the retrieved assignment data, determining a proposal for updating the current assignment structure, the update proposal including a plurality of update proposals generated by the computer system, wherein at least one of the update proposals is for performing at least one action with at least one of the specific tangible assets and wherein determining the update proposal is based upon computer-implemented methods for minimizing costs of performing actions related to specific tangible assets in accordance with the updating of the current assignment structure, while the updating satisfies the requirement by the situation, providing output data to the output interface, wherein the computer-implemented methods for minimizing costs and/or investments of performing actions related to specific tangible assets account for costs related to transport of the specific tangible assets and at least one specific tangible asset is assigned to an inventory including goods for at least one of reuse, scrap, or resale, the output data comprising information options about the plurality of update proposals from which a user may select and information about the at least one action, and performing the at least one action with at least one of the specific tangible assets wherein the specific tangible asset is software and the at least one action includes installing the software on a workplace computer.

13. A computer-readable storage medium having stored thereon instructions that when executed by a processor result in the following:
- receive input data provided at an input interface of a computer system, the input data comprising information about a situation that requires to update a structure of current assignments of specific tangible assets to specific workplaces;
- select, dependent upon the information of the received input data, a workplace profile from a profile database, wherein the workplace profile corresponds to a workplace type and includes a predefined set of asset types, of which types specific tangible assets are to be assigned to a specific workplace of the workplace type, wherein at least one of the specific tangible assets has a different specific tangible asset assigned to it;
- retrieve, from an assignment database, assignment data comprising information about the current assignment structure;
- compare the selected workplace profile with the retrieved assignment data;
- determine an update proposal for updating the current assignment structure, the update proposal including a plurality of update proposals generated by the computer system, wherein at least one of the update proposals is for performing at least one action with at least one of the specific tangible assets, wherein determining the update proposal is based upon computer-implemented methods for minimizing costs of performing actions related to specific tangible assets in accordance with the updating of the current assignment structure, while the updating satisfies the requirement by the situation, wherein the computer-implemented methods for minimizing costs and/or investments of performing actions related to specific tangible assets account for costs related to transport of the specific tangible assets and at least one specific tangible asset is assigned to an inventory including goods for at least one of reuse, scrap, or resale;
- provide output data to an output interface, the output data comprising information options about the plurality of update proposals from which a user may select and information about the at least one action; and
- perform the at least one action with at least one of the specific tangible assets wherein the specific tangible asset is software and the at least one action includes installing the software on a workplace computer.

14. An apparatus for assigning tangible assets to workplaces, the apparatus comprising:
- digital circuitry configured to perform the following actions: receive input data provided at an input interface of a computer system, the input data comprising information about a situation that requires to update a structure of current assignments of specific tangible assets to specific workplaces; select, dependent upon the information of the received input data, a workplace profile from a profile database, wherein the workplace profile corresponds to a workplace type and includes a predefined set of asset types, of which types specific tangible assets are to be assigned to a specific workplace of the workplace type, wherein at least one of the specific tangible assets has a different specific tangible asset assigned to it; retrieve, from an assignment database, assignment data comprising information about the current assignment structure; compare the selected workplace profile with the retrieved assignment data; determine an update proposal for updating the current assignment structure, the update proposal including a plurality of update proposals generated by the computer system, wherein at least one of the update proposals is for performing at least one action with at least one of the specific tangible assets, wherein determining the update proposal is based upon computer-implemented methods for minimizing costs of performing actions related to specific tangible assets in accordance with the updating of the current assignment structure, while the updating satisfies the requirement by the situation, wherein the computer-implemented methods for minimizing costs and/or investments of performing actions related to specific tangible assets account for costs related to transport of the specific tangible assets and at least one specific tangible asset is assigned to an inventory including goods for at least one of reuse, scrap, or resale; provide output data to an output interface, the output data comprising information options about the plurality of update proposals from which a user may select and information about the at least one action; and perform the at least one action with at least one of the specific tangible assets wherein the specific tangible asset is software and the at least one action includes installing the software on a workplace computer.

15. The apparatus of claim 14, wherein the apparatus comprises a programmable processor and the apparatus is configured by instructions stored in a memory for execution by the processor.

16. The computer-implemented method of claim 1 wherein the computer-implemented methods for minimizing costs and/or investments of performing actions related to specific tangible assets account for costs related to production loss due to unavailability of specific tangible assets at workplaces.

17. The computer-implemented method of claim 1 wherein the workplace computer has at least one specific tangible asset assigned to it.

* * * * *